United States Patent [19]

Gilchrist

[11] 3,766,039

[45] Oct. 16, 1973

[54] PROCESS FOR TREATMENT OF LIQUORS USING MULTI-COMPARTMENT BATHS

[75] Inventor: Allan F. Gilchrist, Westlake, Ohio

[73] Assignee: SCM Corporation, Cleveland, Ohio

[22] Filed: May 17, 1972

[21] Appl. No.: 253,933

Related U.S. Application Data

[60] Division of Ser. No. 99,120, Dec. 17, 1970, and a continuation-in-part of Ser. Nos. 76,311, Sept. 28, 1970, abandoned, and Ser. No. 91,905, Nov. 23, 1970, abandoned, and Ser. No. 94,267, Dec. 2, 1970, abandoned.

[52] U.S. Cl............. 204/180 R, 204/299, 204/181, 204/301
[51] Int. Cl............................. B01k 5/00, B01k 5/02
[58] Field of Search................... 204/180 R, 180 P, 204/181, 299, 301

[56] References Cited
UNITED STATES PATENTS

| | | | |
|---|---|---|---|
| 883,170 | 3/1908 | Christy | 204/268 |
| 2,900,320 | 8/1959 | Metcalfe et al. | 204/300 |
| 3,214,362 | 10/1965 | Juda | 204/299 X |
| 3,671,412 | 6/1972 | Lohr | 204/181 |

*Primary Examiner*—John H. Mack
*Assistant Examiner*—A. C. Prescott
*Attorney*—Merton H. Douthitt et al.

[57] ABSTRACT

An improvement is shown in cell process and apparatus for the electrolytic separation of components from electrically-conductive liquor containing dispersed ionizable material electrodepositable on a deposition electrode to build substantial electrical resistance thereon and dissolved ionizing agent therefor, e.g., an aqueous dispersion of electrocoating paint. A primary electrode, charged from an external source, is maintained at each electrical extremity of a body of the liquor, and at least one secondary electrode pervious to ions of the liquor is interposed between the primary electrodes. The secondary electrodes compartment the body into a plurality of zones communicating with each other through such secondary electrodes. Electrical potential between the primary electrodes is applied with the potential between adjacent electrode pairs insufficient for causing electrodeposition on any of the secondary electrodes. An anolyte-enriched liquid and a catholyte-enriched liquid concentrate at the extreme compartments. If desired, the primary electrode opposite the deposition electrode also can be made porous for percolation of electrolyte solution through such primary electrode. Additionally, the deposition electrode can be made porous, and operated for electrodeposition of said ionizable material with the passage of same through such deposition electrode.

7 Claims, 1 Drawing Figure

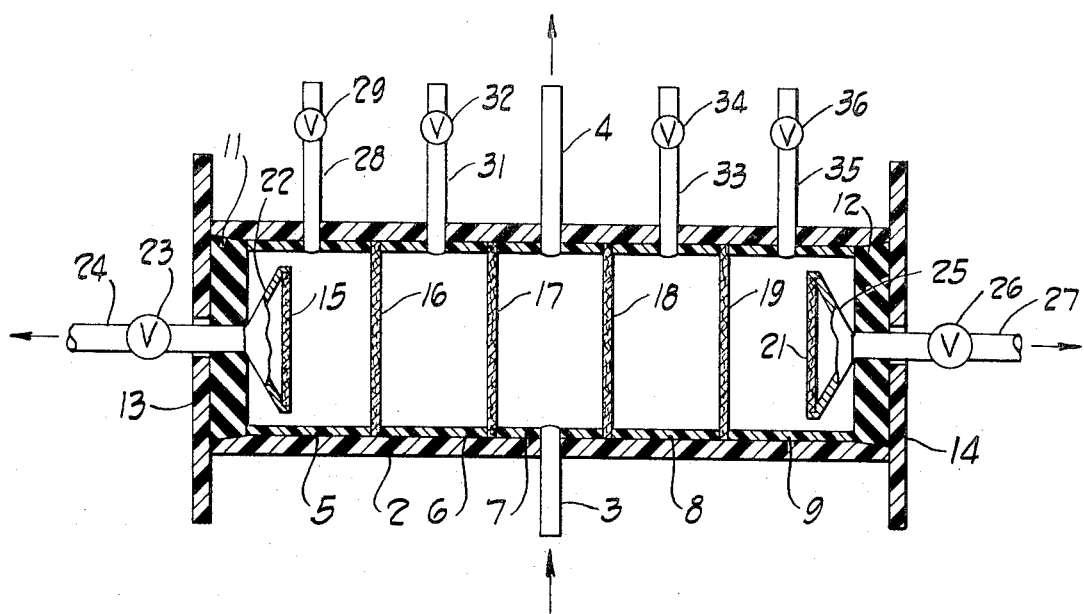

PROCESS FOR TREATMENT OF LIQUORS USING MULTI-COMPARTMENT BATHS

This is a division of application Ser. No. 99,120, filed Dec. 17, 1970.

This patent application is also a continuation-in-part of my copending U. S. Pat. application, Ser. No. 76,311, filed Sept. 28, 1970 now abandoned, Ser. No. 91,905, filed Nov. 23, 1970 now abandoned, and Ser. No. 94,267, filed Dec. 2, 1970 now abandoned, the teachings of which are incorporated by reference.

This invention is an improvement in cell process and apparatus for the electrolytic separation of components from an electrically-conductive liquor containing dispersed ionizable material electrodepositable on a deposition electrode to build substantial electrical resistance thereon and dissolved ionizing agent therefor. The process and apparatus are especially adaptable to treating aqueous electrocoating paint dispersions and rinse waters from electrocoating operations. Treatment of other liquors in accordance with the invention principles, e.g., pigmented dispersions, sewage, black liquor from crude sulfate pulping, and plant and mine wastes containing electrodepositable slimes and gel-formers also are contemplated.

Heretofore it has been proposed to separate aqueous solutions of mixed metalliferous electrolytes through a pair of opposed porous primary electrodes at voltage too low to cause the metals to electroplate on electrodes whereby the ensuing electrically-stressed percolation was stated to yield fairly pure materials in a cascading arrangement (U. S. Pat. No. 1,603,298). In another proposal (U. S. Pat. No. 2,905,604) black liquor from sulfate pulping of wood is electrolytically treated to coat out lignin on the anode. The art of electrolytically producing caustic soda and chlorine from sodium chloride is replete with the use of perforated electrodes, as generally is that of electrolyte purification, e.g., acetic acid solutions and the like.

In the art of electrocoating of paint, with the paint attracted to an anodic substrate, removal of excess of offending basic ions from the paint bath has been proposed by means of dialysis, ion exchange and various species of electrodialysis such as those using rigid or deformable or ion exchange membranes. Principal patents in this field include my U. S. Pats. No. 3,230,162 of Jan. 18, 1966, and No. 3,304,250 of Feb. 14, 1967, wherein a pH of the electrocoating bath is shown to be maintained by electrodialysis while an electrode substrate is being coated. Also illustrative are U. S. Pat. Nos. 3,419,488 and 3,496,083, and Japanese Pat. Publication No. 13231/1970 of May 13, 1970.

To concentrate and/or reclaim electrocoating baths or waste waters therefrom, e.g., rinse waters, for reuse or disposal, it has been proposed to use ultrafiltration and reverse osmosis techniques. These both can be effective, but are costly because the equipment used is essentially of low capacity per unit of invested capital. Recently (Sept. 21, 1970, C&EN, page 39), a closed-loop system of applying ultrafiltration to electrocoating paint baths was announced. In the electrodeposition of rubber a gas-permeable anode was proposed whereby the gases are withdrawn from the anode rearwardly (U. S. Pat. No. 1,583,704).

The instant invention provides an attractive way to treat the subject liquors electrolytically. It provides a way for concentrating and recovering electrocoating binder resins and paint components, dewatering electrocoating baths, and generally providing for the treatment of various electrically-conductive liquors with a plurality of quite coarse porous electrodes having high flow capacity. The effluents from the unit can be further treated in similar apparatus or recycled to the same apparatus, or conducted into other conventional processing devices for further treatment, e.g., ion exchange, distillation, such as vacuum distillation, filtration, ultrafiltration, reverse osmosis, dialysis, electrodialysis, neutralization, and the like.

In one aspect my invention is a process for treating the subject electrically-conductive liquors to concentrate anolyte-enriched and catholyte-enriched liquids from said liquor. The process comprises: forming a body of said liquor with primary opposed electrodes at its electrical extremities, said primary electrodes obtaining their charge from a source external to said body; interposing between said primary electrodes at least one secondary electrode deriving its charge from the electrical conductivity of said body, at least the secondary electrodes being pervious to the ions in said body and compartmenting said body into a plurality of zones communicating with each other through said secondary electrodes; and applying an electrical potential between said primary electrodes with the resulting potential between adjacent electrode pairs being insufficient for causing electrodeposition of said ionizable material on any of said secondary electrodes, thereby causing (a) concentration of said ionizable material in the zone containing said primary deposition electrode, and (b) concentration of said ionizing electrolyte in the zone containing said primary electrode of said opposite polarity.

In another aspect my invention is call apparatus for the subject liquors comprising: a tank for a body of the liquor; primary opposed electrodes at the electrical extremities of said tank; at least one secondary electrode interposed between said primary electrodes, said secondary electrodes being pervious to the ions in said body of liquor and compartmenting said body into a plurality of zones communicating with each other through said secondary electrodes; and means for applying electrical poten-tial between said primary electrodes with the resulting potential between adjacent electrode pairs being insufficient for causing electrodeposition of said ionizable material on any of said secondary electrodes.

Further aspects of my invention involve combining the foregoing with the principles of my copending U.S. Pat. applications, Ser. No. 76,311, Ser. No. 94,267 and/or Ser. No. 91,905.

In the first such combination percolation of ionizing electrolyte is obtained through a porous primary electrode opposite the deposition primary electrode and at least about 1/32 inch thickness. Such electrode forms a boundary area of the tank. In the second such combination a porous primary deposition electrode forms a boundary area of the tank; such primary deposition electrode can be operated to obtain an electrodeposit of said ionizable material; and pressure is provided for forcing resulting electrodeposited material through the pores of said deposition electrode; alternatively, no such electrodeposit is effected, but rather liquid medium enriched in said ionizable material is forced through the porous deposition electrode.

The drawing shows in cross-sectional elevation a cell apparatus for concentrating and recovering aqueous electrocoating paint dispersion. Item 2 is a horizontal, cylindrical casing of clear acrylic plastic. The dispersion is passed upwardly and into the cell through inlet 3, suitably by pump not shown or an elevated reservoir of the dispersion. The dispersion can be circulated through the apparatus by withdrawing a stream through outlet 4 and returning it to the pump suction reservoir. Alternatively, outlet 4 can be used simply as a vent for gases and can be throttled with a valve if desired, whereby input liquid flows to the right and left.

In the cell porous secondary electrodes 16, 17, 18, and 19 are held in place vertically by cylindrical spacers of the same plastic, the spacers being numbered, 5, 6, 7, 8, and 9. Each such secondary electrode is sealed at its junction with the spacers by O-rings and hot melt adhesive, not shown, to prevent bypass of liquid around them. The primary electrodes are porous plates 15 and 21, respectively. Primary electrode 15 is fitted into funnel 22 which is necked down to pass through insulating plug 11 and flange 13. Flow through this electrode can be throttled by valve 23 to pass through outlet 24. Primary electrode 21 is fitted into funnel 25 which necks down to pass through plug 12 and flange 14. The flow through this electrode can be throttled by valve 26 to pass through outlet 27.

Vents 28, 31, 33, and 35 arise from their several chambers to vent off gas, and these can be throttled, if desired, by valves 29, 32, 34, and 36, respectively. In place of the valves shown in the apparatus, the vents and liquor outlet can simply be extended upward to provide whatever the liquid head is desirable on the apparatus to prevent flow of liquid from the vents and to regulate back pressure on the primary electrodes relative to pressure of the inlet liquor. Flanges 13 and 14 hold the apparatus intact with thrubolts in tension, the thrubolts not being shown in the drawing.

In operation one of the primary electrodes is charged anodically and the other cathodically from an external d.c. power source not shown. This can be done simply by making the protruding funnels of electrically-conductive metal and having the electrical connection external to the flanges. Then, if the anolyte is an aqueous dispersion of anodic electrocoating paint binder (optionally with other electrodepositable paint components), typically one like that described in Example 1 of U. S. Pat. No. 3,230,162, and primary electrode 15 is charged as the anode, electrode 15 is the deposition electrode for concentrating and recovering an anolyte comprising such paint binder. In such instance the electrode 21 is the cathode, and catholyte of aqueous base solution passes therethrough.

If, however, the electrocoating paint dispersion to be treated has a cathodic binder, such as the paint bath shown in Example 1 of U. S. Pat. No. 3,455,806 (co-polymer resin with tertiary amine functionality ionized with acetic acid), cathode 21 would be the deposition electrode and anode 15 would be the electrode for passage of aqueous acidic solution.

In one mode of operation the voltage across the primary electrodes and the positioning of the various electrodes is done so that no deposition occurs on or in any electrode. However, if desired, the voltage across the electrodes and positioning of the deposition electrode can be such that a concentrated emulsion or resinous deposit collects at the face of the deposition electrode and is drained therethrough for recovery. It should be recognized, however, that the primary electrodes 15 and 21 can be made impervious, if desired, and a concentrated anolyte withdrawn from the cell through vent line 28 while a concentrated catholyte is withdrawn through vent line 35.

Preferentially the secondary electrodes are porous metal plates at least about 1/32 inch thick, as are the primary electrodes. However, the primary deposition electrode can be made very coarsely foraminous if desired and covered, for example, with a non-conducting porous membrane such as Dutch twill weave of nylon or polyester cloth having reasonable porosity, e.g., about 15–50 microns up to 150 microns, or even more porous than this. Such membrane-covered electrode often is adequate for passing emulsified concentrates of resinous and gel-forming materials through it. However, if a film or body of resin or gel is to be deposited on such electrode, an uncovered, fully electrically-conductive deposition electrode is distinctly preferred to reduce plugging tendencies.

In most instances the operation of the electrolytic cell apparatus will be done with aqueous liquids at or above room temperature, advantageously above 100°F., and preferably at about 120°–140°F. when separating and collecting an electrocoating paint binder or paint concentrate through a porous electrode. Lower temperature can be used when desirable or necessary, provided that the liquor (and the electrodeposit therefrom when it is being separated through an electrode) are in fluent condition and can be made to flow under pressure. Other electrically-conductive media susceptible to autoionization such as glacial acetic acid, acetic anhydride, HCN, hydrazine, hydroxylamine, $SO_2$, HF, $H_2SO_4$, $COCl_2$, acetonitrile, a nitromethane, liquid ammonia and tetrahydrofuran are contemplated broadly also in the liquid phase where their oxidative and other dangerous properties can be controlled safely. Operating pressures and the materials of construction would, of course, be designed accordingly.

In general , temperature of liquor in the cell is restricted advantageously to avoid boiling of the liquor with attendant fumes, etc. and such temperatures also are restricted to diminish undesirable emissions or degradation of material in process if such considerations are important in the operations. However, where a high temperature can be tolerated, such as one approaching or reaching the boiling point of the liquor in process under the prevailing pressure conditions, one can use such high temperature advantageously for further reducing viscosity and electrical resistivity of any film deposited on the deposition electrode.

The pressure used must be at least slightly positive on the deposition side of the porous primary deposition electrode to force electrodeposited material therethrough. Usually a few inches of water pressure differential across such electrode is adequate and is supplied hydraulically, by pump, but much higher pressure can be used, e.g., 20 or 30 psig. or even greater where the equipment can tolerate such pressure. Optionally, however, other conventional pressure means can be used for such forcing, e.g., pressure rolls, pistons, squeegees, and the like. Pressure on the opposite electrode generally is exerted hydraulically by pump, and only a slight differential across the opposite electrode, if it is porous, is needed to force passage of dissolved electrolyte very adequately. Naturally, higher pressure can be used for this purpose, and highest overall voltages give greatest electrical construction against the passage of ions of the same charge as such primary electrode through such electrode.

Absolute permeability of porous electrodes for use in this invention is defined in and can be tested in accordance with the procedure shown in proposed SAE Aeronautical Information Report (AIR–887), Mr. Robert I. Gross, 1965, Aircraft Porous Media, Inc., Glen Cove, New York, designated as APM-FSR-26.

The electrodes advantageously are made of metal, e.g., A.I.S.I. 300 and 400 series stainless steels, monel, nickel, Inconel, or the like, and are best substantially inert to all the components of the liquor. Alternatively they can be built of electrically-conductive carbon such as graphite or of metal-coated ceramic or plastic, or the like, or even one or more very fine electrically-conductive screens or sieves, or powdered metal pressed and sintered onto a screen. Such electrodes need not be self-supporting, but can be enclosed in a coarsely foraminous support casing if desired. The preferred porous electrodes here are porous austenitic stainless steel plates because of their effectiveness, their resistance to attack, and their structural strength. Ordinarily many of these are scaled alphabetically typically as follows by the Pall-Trinity Micro Corporation, Cortland, New York, U.S.A.

|  | C | D | E | F | G | H |
|---|---|---|---|---|---|---|
| Mean Pore Size, Microns | 165 | 65 | 35 | 20 | 10 | 5 |
| Absolute Porosity for Liquids, Microns | 160 | 55 | 35 | 25 | 15 | 12 |

The selection of suitable porous electrodes for the cell to some extent is determined by the kind of liquor being proc-essed and desired degree of solids concentration, separation, and electrolyte filtration which is wanted from the liquor. Thus, I have found that the treatment of rinse waters from electrocoating baths like that of Example 1 of U. S. Pat. No. 3,230,162 can use advantageously such "E" or "F" grade porous stainless steel cathode plate for dewatering and removing amino materials; C-D plates for permeable anodes in such instance appear to be excellent for obtaining permeation of resin or paint concentrates. On the other hand, baths like that shown in Example 3 of said patent appear to me to be better processed for removing amino materials with an electrode plate of about "G" porosity.

Because there is needed flow of ionic materials in both directions through the secondary electrodes, it is best to make these of bed depth of at least one thirty-second inch and preferably one-eighth inch to one-fourth inch to provide an appropriate electrical field. Even thicker beds can be used if they have virtually no electrical resistance, e.g., one-half inch and up. The absolute porosity of liquid for such secondary electrodes broadly is effective between about one micron and a little less (e.g., 800 millimicrons) up to about 200 microns, advantageously from 5–100 microns, and preferably from about 12–50 microns. The minimum porosity can be much smaller, but plugging is more apt to occur and the expense is much greater to make and use. They must pass the dispersed particles to achieve concentration. On the other hand, if the absolute porosity is substantially greater than about 200 microns, the cell operation can be fairly delicate and difficult for achieving much separation or concentration of ionizing electrolytes at useful voltages. The absolute porosity of the primary electrode opposite the deposition electrode for permeation of the ionizing electrolyte solution, if such electrode is to be porous at all, should follow the same criteria. The absolute porosity of the deposition electrode advantageously is between about 50 and 200 microns and preferably between 100 and 200 microns, although it can be finer with attendant finer filtration and slower rate, or coarser if substantially effective sealing by the electrodeposit occurs to prevent electrolyte materials of opposite charge from too much penetration.

However, if desired, either porous primary electrode face towards the liquor in the cell and one or both sides of each secondary electrode can be covered with a non-conducting porous filtering barrier such as a fabric, suitably Dutch twill cloth, filter paper (although this is apt to deteriorate fairly soon in some liquors), a mat or weave or knit of glass fiber, synthetic fiber, or the like. Such element can act to restrain liquid flow through the electrodes and can stop penetration thereof by very coarse material in the liquor. For the secondary electrodes and the deposition electrode, it is advantageous that such filtering barrier have absolute porosity of about 800 millimicrons to 200 microns and preferably between about 50–200 microns. For the porous primary electrode opposite to the deposition electrode such barrier advantageously has porosity of from 5–100 microns and preferably from about 12–50 microns. When such fabric, for example a twill with porosity of about 30–50 microns is used in this manner, all of the electrodes can be made considerably more coarsely porous than stated above with still quite useful transfer, collection, and separating ability. The covering of the deposition electrode also assists in retaining heat about such electrode for increasing fluidity and lowering electrical resistivity of deposits such as resin. As ionic resins are now utilized in some cases for assisting in filtration of sewage, it is conceivable that such resins can be recovered in accordance with the invention principles through porous electrode members.

The voltage between anode and cathode of the cell apparatus should be net unidirectional. It can be pulsed or have shaped nodes, but preferably is rectified a.c. but with not more than about a 15 percent ripple factor for best results. Where straightline d.c. power is available, this power, of course, can be used with excellent effect.

The voltage used is generally above that necessary to electrolytically dissociate some of the vehicle of the liquor. In most cases, the liquor is aqueous, and such dissociation is above about 1.8 volts, whereby hydrogen is liberated from the cathode and oxygen from the anode.

The currently most used electrocoating paints include pigmented and clear-depositing materials. They comprise or consist of film-forming resinous binder dispersed in water with aid of ionizing agent (electrolyte) that ionizes at least a portion of ionizable sites in the resin which forms a significant fraction of said binder. Ordinarily such dispersion will contain additionally organic solvents, plasticizer, anti-foam agents, wetting agents, and if pigmented, will contain pigments, fillers, optional stains and colorants, heat fusible or practically infusible resin particles, metal particles, glass frit occasionally, synthetic and natural latices, etc. Concentrates of such paint usually contain 0–70 percent water and often have no, or very little, ionizing agent in them.

My studies have indicated, as pointed out in U. S. Pat. application, Ser. No. 76,311, that the invention can be used to achieve a degree of separation of various kinds of pigments from dispersion, thereby concentrating carbon black with respect to titania, titania with respect to clays, etc. if desired.

To preclude electrodepostion of said ionizable material, e.g., an electrocoating paint binder on a deposition electrode or any secondary electrode, the voltage difference between such electrode and its opposed adjacent electrode in the pair should be below that which would cause such deposition in or on the electrodes.

For a particular liquor and electrodes at a given spacing, e.g., 2.5 cm., the maximum voltage before incipient deposition can be tested in a simple cell without agitation by raising the voltage between the two electrodes from zero and noting when the rise in current flow by ammeter between them breaks with increasing voltage and begins to level off or drop, indicating incipient deposition. For conventional anodic paint dispersion such as that shown in Example 1 of U. S. Pat. No. 3,230,162 at about 10 percent concentration of resinous binder in the dispersion at 80°F. and quiescent cell conditions, the maximum voltage which can be used is about 5 volts, such maximum voltage would be about 8–9 volts for about 1 percent concentration of the same resinous binder. The effect of temperature is broadly inverse to liquor electrical resistivity.

In this application and in its parent applications, when a voltage or electrical potential between adjacent electrode pairs insufficient for causing electrodeposition of the ionizable material on electrodes, e.g., secondary electrodes, is referred to, it will be understood that what is meant most accurately is that such electrodepositing material is redissolved at a rate equal to or faster than it is being deposited on such electrode. Accordingly, the net deposition is nil.

Minimum deposition voltage thus can be considered to be the highest electrical potential (voltage) above the decomposition potential of the liquid medium, most commonly water, that will support a Faradic current (ampere) flow capable of electrodepositing such material at a rate exactly equal to the redissolving rate of such deposit. Factors affecting such deposition include fluid flow over the electrode surface, concentration of ionizing electrolyte for such depositable material, pH, temperature, and electrical conductivity of the liquor present in the various chambers.

At a constant applied voltage, a decrease in ampere flow indicates an increase in system electrical resistance due to a deposition rate in excess of the redissolving rate of the electrodepositable material on the electrode. An increase in ampere flow indicates a decreasing system electrical resistance and such deposition rate less than the redissolving rate on the electrode. A constant ampere flow then indicates a deposition rate equal to the redissolving rate of the depositable material onto an electrode.

The equipment preferably is arranged so that gas generation does not cause changes in the resistance of the system because of diminution in electrode surface area available for contact with the bath.

In some respects, the apparatus with multiple secondary electrodes has some of the aspects of a plate and frame filter press. The apparatus need not be fed symmetrically as shown in the drawing, but fed asymmetrically. Thus, for example, anodic resin appears to separate and concentrates with greater facility than does its ionizing amine. Hence, it can be valuable in some cases to devote more chambers to the concentration of the amine. In some cases it may be desired also to concentrate certain pigments relative to others by secondary electrode spacing and/or making the secondary electrodes more or less porous with respect to one another so that clay will tend to enrich in one chamber on the resin concentration side of the cell, titanium at a farther one, and carbon being the richest in the most remote one adjacent to the deposition electrode.

The following examples further delineate my invention, but should not be construed as limiting it. In this application, all parts are parts by weight, all percentages are by weight, and all degrees are in degrees Fahrenheit, unless otherwise expressly indicated. Nonvolatile matter (NVM) is reckoned as the residue on curing a sample of the subject liquor at 350°F. for 50 minutes.

EXAMPLE 1

An open-top, rectangular, non-conducting plastic electrocoating tank had a primary electrode at each end and was divided into three zones of equal size with two vertical secondary electrodes. Each electrode was an impervious, phosphate-treated, cold-rolled steel sheet sealed to the long tank sides and to the bottom. Each zone in the tank, labeled A, B, and C from left to right, was filled to the same depth with a conventional aqueous anodic electrocoating paint dispersion. The end electrode on the right-hand side was the primary cathode. The end electrode on the left-hand side was the primary anode.

Preparation of the resinous binder concentrate and the pigment has been described in Example 1 of U. S. Ser. No. 76,311 (that is, resin based on vinyl toluenated, maleinized linseed oil, extended with non-heat reactive phenolic resin and ionized with morpholine).

Pigment, resinous binder concentrate, and sufficient water was blended together to give a stable dispersion of 12 percent by weight NVM with a 3:1 weight ratio of binder to pigment. At a temperature of 77°F., the primary (end) electrodes were charged with 100 volts across them from an external source for two minutes (rectified a.c. with about 5 percent ripple factor). The primary cathode received no coating; the primary anode coated on its right side; the two secondary electrodes coated on their right sides only. No coating appeared on the left side of any of the electrodes, including the left side of the anode which was not in contact with the paint dispersion.

The left-hand secondary electrode functioned as a cathode with respect to zone A, and the right-hand secondary electrode a cathode with respect to zone B. These plate electrodes were spaced 10 cm. apart. Each side of the electrodes exposed to the bath had 85 square centimeters of area. Specific resistivity of the bath at 77°F. was 625 ohm/cm.

The coating was as follows:
Primary anode 0.098 grams or about 0.29 mil thickness;
Left Secondary Electrode 0.083 grams or about 0.23 mil thickness;
Right Secondary Electrode 0.080 grams or about 0.22 mil thickness.
Calculated total bath resistance across the cell from primary anode to primary cathode (without any coating) was 222 ohms. First recording of current flow indicated total resistance of 271 ohms between primary electrodes. Current flow at the end of the two minutes indicated coating plus total resistance of 3,522 ohms. The total deposited film resistance was about 3,300 ohms.

Calculated voltage drops, using current flow and grams of coating applied to determined zone resistances, provided the following voltage distribution: Primary cathode to right secondary electrode — 31 volts; right secondary electrode to left secondary electrode — 32 volts; and left secondary electrode to primary anode — 37 volts.

Based on this data, if porous secondary electrode plates are substituted for the impervious secondary electrodes and 12–15 volts are applied across the cell from primary anode to primary cathode, zone A will become enriched in electrocoating paint solids and zone C in ionizing amine without deposition of any paint solids on any of the electrodes.

EXAMPLE 2

The apparatus used was like that of the drawing, except that no valves were placed on outlet and vent lines. Instead, vents 28, 31, 33, 35, and outlet 4 were merely run vertically upward to act as gas vents and to maintain a static head on the apparatus. Anode 15 on the left drained through outlet 24, without a valve 23, and upward to a height regulated to put back pressure on the anode. Similarly, cathode 21 on the right drained without a valve 26 through outlet 27 raised upward to regulate height to put back pressure on the cathode. The fluid heads were measured from the horizontal center axis of the cylindrical apparatus in terms of inches of liquor in the vertical legs. Rectified a.c. power like in Example 1 was used.

Each electrode face had a 2½ inch diameter area exposed to the liquor and was one-eighth inch thick, porous A.I.S.I. 316 stainless steel furnished by the Pall-Trinity Micro Corporation. The electrode pairs were spaced one from another, 5 cm. on center. Temperature was 77°–80°F.

The electrode porosities were as follows: Anode 15 was a "G" grade Pall-Trinity Micro Corporation plate; cathode 21 had about one micron absolute porosity; secondary electrode 16 was an "E" grade plate of the same company; secondary electrodes 17 and 18 were "D" grade plates of the same company; and secondary electrode 19 was an "F" grade plate of the same company.

An aqueous anodic electrocoating paint dispersion made from a resinous binder concentrate like that of Example 1 of U. S. Ser. No. 76,311 was ionized and dispersed in deionized water with morpholine to give a dispersion concentration of 5.37% NVM.

One run at 20 volts d.c. between anode 15 and cathode 21 was made by feeding the aqueous ionized resin dispersion through inlet 3 at a fluid head of 37 cm. Back pressure against both anode 15 and cathode 21 was 20 cm. The anolyte concentrated to 6.09% NVM flowing at 6 grams per minute while the catholyte under these conditions was reduced to 4.72% NVM, flowing at 2 grams per minute.

After a small amount of running the cathode flow slowed somewhat. At the same 20 volts between anode and cathode the back pressure on the anode was lowered to 16 cm. and the back pressure on the cathode to zero gauge. The NVM of the anolyte was 6.02% flowing at 2.8 grams per minute while the cathode flow was at one gram per minute and 4.11% NVM. During a running the right-hand cell chamber nearest the cathode cleared up considerably.

The voltage was raised to 30 volts between anode and cathode and the feed head to 64 cm. Back pressure on the anode was 20 cm. and zero gauge on the cathode. Voltage drops between the five vertical metal tubes (4, 28, 31, 33, and 35) were measured and found to be about 5 volts between each pair of adjacent tubes. The anolyte flow was two grams per minute at 7.17% NVM, a concentration of 34 percent based on the feed. This later declined to slightly over 1.5 grams per minute at 8.06 percent NVM, a concentration of 50 percent based on feed.

The catholyte flow was 0.3 grams per minute at 1.26% NVM, a decrease of 76 percent in NVM. Later this increased to 0.5 grams per minute at 0.53% NVM, a 90 percent decrease in NVM. In no instance on any of the tests did noticeable electrodeposition of resin occur on or in any electrode.

While the foregoing examples have described treatment of aqueous electrocoating paint compositions containing an amine as ionizing electrolyte for the resin, it should be understood that other bases, e.g., those containing potassium, sodium, lithium, aqua ammonia, and mixtures of such bases with each other and with amines, are suitable for similar processing.

What is claimed is:

1. In a process for the electrolytic treatment of an electrically-conductive liquor which contains dispersed ionizable material electrodepositable therefrom onto a deposition elec-trode to build electrical resistance thereon and dissolved ionizing electrolyte for said material, the improvement for separating anolyte-enriched and catholyte-enriched liquids from said liquor which comprises:
   forming a body of said liquor with primary opposed electrodes at its electrical extremities, said primary electrodes being a deposition electrode and an electrode of opposite polarity and obtaining their charge from a source external to said body;
   interposing between said primary electrodes at least one secondary electrode deriving its charge from the electrical conductivity of said body, the secondary electrodes being pervious to the ions in said body and compartmenting said body into a plurality of zones communicating with each other through said secondary electrodes;
   applying an electrical potential between said primary electrodes with the potential between adjacent electrode pairs being insufficient for causing electrodeposition of said material on any of said secondary electrodes, thereby causing concentration of:
   a. said ionizable material in the zone containing said primary deposition electrode, and
   b. concentration of said ionizing electrolyte in the zone containing said primary electrode of opposite polarity.

2. The process of claim 1 wherein said primary electrode of opposite polarity to said deposition electrode is pervious to dissolved ionizing electrolyte and is disposed to form a boundary area of said bath.

3. The process of claim 1 wherein said primary deposition electrode is disposed to form a pervious boundary area of said body, and said ionizable material is forced through the pores of said deposition electrode.

4. The process of claim 3 wherein said liquor is aqueous and said ionizable material comprises an electrocoating paint binder.

5. The process of claim 4 wherein the temperature of said primary deposition electrode is maintained substantially above room temperature for reducing viscosity and electrical resistivity of electrodeposited material.

6. The process of claim 4 wherein said paint binder is an anodic paint binder, and said primary deposition electrode is an anode.

7. The process of claim 4 wherein said paint binder is a cathodic paint binder, and said primary deposition electrode is a cathode.

* * * * *